F. ZALESKI.
COMBINED CLUTCH AND STOP MOTION.
APPLICATION FILED MAR. 30, 1915.
1,164,901.
Patented Dec. 21, 1915.
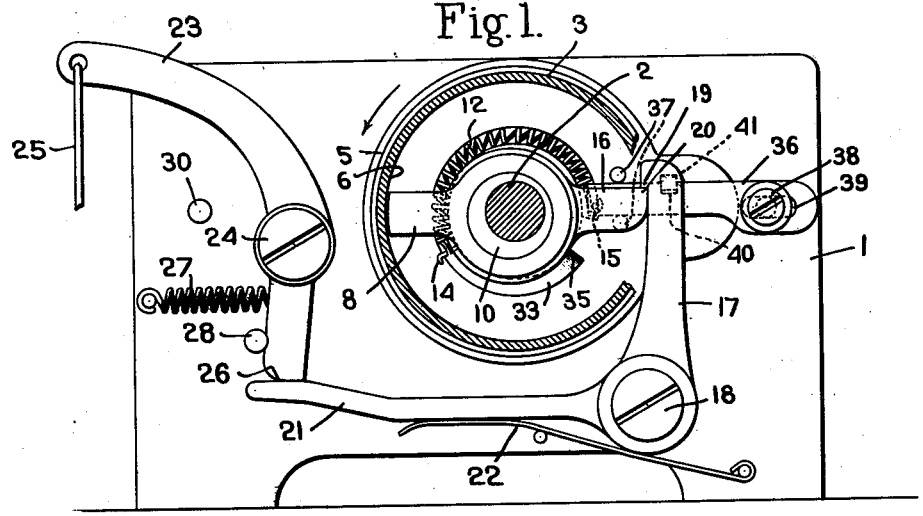
Fig. 1.
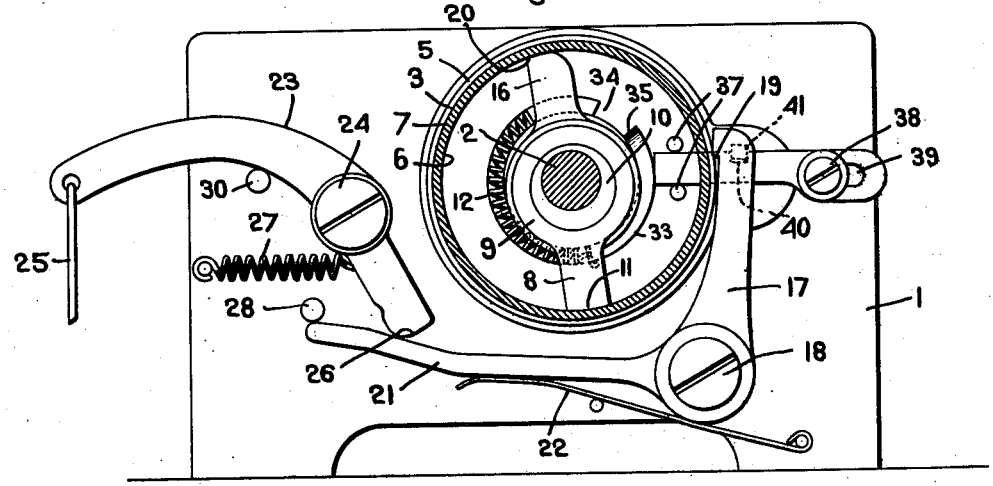
Fig. 2.
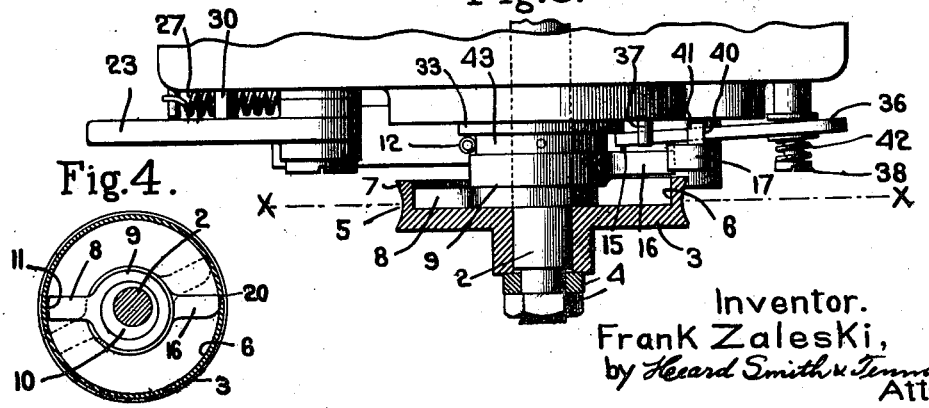
Fig. 3.
Fig. 4.
Inventor.
Frank Zaleski,
by Heard Smith & Tennant
Atty's.

UNITED STATES PATENT OFFICE.

FRANK ZALESKI, OF SOMERVILLE, MASSACHUSETTS, ASSIGNOR TO THE REECE BUTTON HOLE MACHINE COMPANY, OF BOSTON, MASSACHUSETTS, A CORPORATION OF MAINE.

COMBINED CLUTCH AND STOP-MOTION.

1,164,901.  Specification of Letters Patent.  Patented Dec. 21, 1915.

Application filed March 30, 1915. Serial No. 18,133.

*To all whom it may concern:*

Be it known that I, FRANK ZALESKI, a subject of the Emperor of Germany, residing at Somerville, county of Middlesex, State of Massachusetts, have invented an Improvement in Combined Clutches and Stop-Motions, of which the following description, in connection with the accompanying drawing, is a specification, like characters on the drawing representing like parts.

This invention relates to a combined clutch and stop motion adapted for clutching a shaft to a driving element and unclutching the shaft therefrom and bringing the shaft to rest, and the object is to provide a device of this nature which is simple in its construction, which is positive in its action, which operates to effect the clutching of the shaft to the driving member, and the unclutching therefrom, and the stopping of the shaft with a minimum amount of jar or vibration, and which is comparatively noiseless in its operation, thus making it especially well adapted for high speed work.

In order to give an understanding of my invention I have illustrated in the drawings a selected embodiment thereof which will now be described, after which the novel features will be pointed out in the appended claims.

In the drawings, Figures 1 and 2 are sections taken on substantially the line $x$—$x$, Fig. 3, Fig. 1 showing the shaft unclutched from the driving element and locked against rotation, and Fig. 2 showing the clutch in operation; Fig. 3 is a plan view of the device shown in Fig. 1 with the driving clutch element shown in section; Fig. 4 is a diagrammatic view illustrating the operation of the clutch mechanism.

The clutch and stop mechanism herein illustrated and described is capable of general use for driving the shaft of any machine, and I have not, therefore illustrated any particular machine but have simply indicated at 1 the frame of a machine the operation of which is to be controlled by my improved mechanism.

2 designates a driving shaft by which the operative parts of the machine are driven.

My improved clutch and stop mechanism comprises two clutch elements mounted on the shaft 2, one of said elements being eccentrically mounted on the shaft and having an eccentric relation to the other element, the construction being such that relative movement between the second clutch element and the shaft in one direction causes the two clutch elements to be thrown into clutching engagement and relative movement in the opposite direction releases the clutching engagement. Automatically-operative means are provided which tend normally to move the second clutch element into clutching engagement with the driving clutch element, and manually-controlled means are provided for effecting the necessary relative movement between the second clutch element and the shaft to disengage the clutch. This manually-controlled means also coöperates with the second or eccentrically-mounted clutch element to bring the shaft to rest and lock it from further movement until the second clutch element is released again. The driving clutch element is herein shown as a driving pulley 3 which is concentrically and loosely mounted on the shaft, said driving element being held in position on the shaft by the lock nuts 4. This driving clutch member 3 is provided with a peripheral belt-receiving groove 5 and is also provided with the clutch surface 6 with which the other clutch element coöperates, said clutch surface being herein constituted by the inner peripheral face of a flange 7 with which the clutch element 3 is provided, said peripheral face being concentric with the shaft 2. The other or second clutch element is shown at 8 and it is herein illustrated as a clutching finger or projection carried by a hub or sleeve 9 that is loosely mounted upon the eccentric portion 10 of the shaft 2. Since the hub 9 is thus mounted on the eccentric portion of the shaft 2, it will be seen that turning movement of the hub 9 in one direction relative to the shaft will withdraw the end 11 of the clutch member 8 from the clutch surface 6 of the member 3, while relative turning movement of the hub 9 and shaft 2 in the opposite direction will throw the end of the clutch element 8 into clutching engagement with the clutch surface 6. This is well illustrated in Fig. 4 wherein the clutch elements are shown diagrammatically, and the clutch element 8 is shown in full lines unclutched from the element 3. Fig. 4 shows in dotted lines the relative positions of the two elements when they are clutched together, and it will be clear from an inspection of Fig. 4 how rotation of the clutch element 8 from its full to its dotted line position will bring the clutch surface 11 into clutching engagement with the clutch surface 6 by reason of the eccentric mounting of the sleeve 9.

The operation of clutching the two clutch elements together or unclutching them from each other involves, therefore, simply a turning movement of the hub 9 in one direction or the other relative to the shaft 2. Automatically-operative means are employed acting on the clutch element 8 and tending normally to turn it relative to the shaft in a direction to bring it into clutching engagement with the driving element 3. This automatically-operative means may have any suitable construction, but as showing a simple device I have illustrated a spring 12 which partially encircles the shaft, and one end of which is connected to a pin 14 rigid with the shaft, and the other end of which is connected to a pin 15 rigid with the sleeve 9. This spring is a contracting spiral spring and its natural tendency is to turn the sleeve 9 relative to the shaft 2 in the direction of the arrow Fig. 1, such turning movement operating by reason of the eccentric mounting of the sleeve 9 to bring the clutch member 8 into clutching engagement with the clutch element 3. The clutch element 8 has such proportions that the clutch face 11 thereof is brought into engagement with the clutch surface 6 of the driving element 3 before said element 8 has passed the point of greatest eccentricity of the eccentric portion 10, as will be seen by the dotted line position Fig. 4, and when the clutch element 8 is in this position it is not only clutched to the clutch element 3, but it is also wedged in between the surface 6 of the clutch element 3 and the eccentric portion 10 of the shaft 2, thus positively coupling the driving clutch element 3 to the shaft. The clutch element 3 is driven in the direction of the arrow Fig. 1, and, therefore, as soon as the clutch element 8 is released and is automatically moved into its clutching position, as shown in dotted lines Fig. 4, said clutch element 8 becomes wedged between the clutch surface 6 and the eccentric portion 10 of the shaft so that the rotation of the driving element 3 will be communicated through the clutch element 8 to the shaft, these parts being frictionally locked together. To unclutch the shaft from the driving element 3 means are provided to engage the clutch element 8 and give it a reverse turning movement relative to the shaft thereby to withdraw the clutch face 11 from the clutch face 6 and allow the driving element 3 to run free. The means for accomplishing this also coöperates with the clutch element 8 to bring the shaft to rest instantly. The clutch element 8 has associated therewith a releasing projection 16 herein shown as a nose or extension extending from the sleeve 9. This nose or projection is offset slightly from the clutch member 8 so that it is located in a plane at one side of the clutch element 3. Pivoted at 18 to the frame 1 or to any suitable part is a releasing dog 17 having a stop shoulder 19 that is adapted to be moved into and out of the path of the end of the projection 16. When the releasing dog 17 is in the position shown in Fig. 2, the stop shoulder 19 is removed from the path of travel of the releasing projection 16 and the clutch elements will be operative to drive the shaft forward. If, however, the releasing dog 17 is moved into the position shown in Fig. 1, the shoulder 19 will be brought into the path of movement of the end of the projection 16, and the latter during its movement will strike the shoulder 19, as shown in Fig. 1, thus arresting the rotation of the sleeve 9 and clutch member 8. Since the shaft 2 is rotating the momentum thereof will carry it forward relative to the clutch member 8, thereby causing a backward turning movement of the clutch member 8 relative to the shaft 2, this backward movement bringing the parts into the relative position shown in full lines Fig. 4 and releasing the clutch. This clutch-releasing member is so constructed that it coöperates with the eccentric portion 10 of the shaft to bring the shaft to rest instantly that the clutch is released. The means which I have herein illustrated for this purpose comprises a device operating not only to throw the releasing dog 17 into the clutch-releasing position shown in Fig. 1, but to lock said dog in such position and prevent backward movement thereof. As a result, when the clutch-releasing dog 17 is in the position shown in Fig. 1, it not only stops rotation of the clutch member 8 by engagement with the projection 16, but it also prevents the member 8 and sleeve 9 from moving to the right by reason of the engagement of the end 20 of the projection 16 with the dog 17. It will be readily seen that if the sleeve 9 and its clutch member 8 are held from rotation while the shaft 2 is continued in rotation in the direction of the arrow Fig. 1, the eccentric portion 10 will give the sleeve 9 and projection 16 a movement to the right Fig. 1. If, however, the clutch-releasing dog 17 is locked against movement to the right, then the sleeve 9 will be prevented from such movement by the engagement of the projection 16 with the dog 17 and the shaft 2 will thereby be prevented from further rotative movement. The clutch-releasing dog 17 of the projection 16 and sleeve 9 thus coöperate with the eccentric portion 10 to stop the shaft instantly that the clutch is released.

While any suitable means for operating the clutch-releasing dog 17 and for locking it against movement when in its operative position may be employed, I have illustrated for this purpose the following simple mechanism: The clutch dog 17 has rigid therewith an arm 21 which is shown as acted upon by a suitable spring 22 that tends normally to throw the clutch-releasing dog into its inoperative position. 23 is a manually-actuated lever pivoted at 24 to the frame 1 or some other suitable support, said lever being adapted to be actuated either by hand or by a treadle through a suitable connection 25. This lever 23 is acted upon by a suitable spring 27 which tends normally to move it into the position shown in Fig. 1, and the lower end of the lever is provided with the cam surface 26 which engages the end of the arm 21 when the lever 23 is moved from the position shown in Fig. 2 to that shown in Fig. 1. The turning of the lever into the position shown in Fig. 1 acts through the cam portion 26 to depress the arm 21 thereby to move the clutch-releasing dog 17 into its operative position. 28 is a stop which limits the swinging movement of the arm 23 under the influence of the spring 27, and this stop is so located that when the lever 23 rests thereagainst the cam portion 26 of the lever is situated substantially at right angles to the arm 21.

As stated above, the parts are shown in Fig. 1 in the position they assume when the clutch is released and the driving element 3 is running free. To render the clutch operative the lever 23 is swung into the position shown in Fig. 2, its movement in this direction being limited by a suitable stop 30. This swinging movement of the lever 23 carries the cam 26 out of engagement with the arm 21, thus allowing the spring 22 to swing the clutch-releasing dog 17 into its inoperative position thereby releasing the clutch member 8. The spring 12 then acts automatically to turn the clutch member 8 relative to the shaft to throw said member into clutching engagement with the driving clutch member 3, this movement resulting in frictionally locking the two clutch members and shaft together, as above described.

When the clutch is to be disengaged, the lever 23 is released, allowing the spring 27 to swing said lever into the position shown in Fig. 1. This movement depresses the arm 21, thereby swinging the clutch-releasing dog 17 into its operative position shown in Fig. 1 so that on the next rotation the projection 16 will engage the shoulder 19 and cause disengagement of the clutch. It will be noted that when the lever 23 is in the position shown in Fig. 1, the cam end 26 thereof stands at right angles to the arm 21 and, therefore, it acts as a lock to hold positively the clutch-releasing dog 17 in its operative position. The clutch-releasing dog thus being locked in this position acts not only to disengage the clutch, but also to bring the shaft to rest as above described.

The mechanism herein illustrated has been especially designed for use in connection with high speed machines in which the shaft rotates rapidly, and the device comprises means coöperating with the clutch elements above described to insure the positive disengagement of the clutch and stopping of the shaft, regardless of the relative position of the projection 16 and clutch-releasing dog 17 when the lever 23 is released. If the shaft is rotating very rapidly and the lever 23 should be released just before the projection 16 in its rotation comes into the position shown in Fig. 1, it might happen that the clutch dog 17 would not be fully moved into its operative position before the projection 16 was carried into position to engage the shoulder 19 due to the fact that the time necessary to give the lever 23 and clutch-releasing dog 17 their complete movement is greater than that required for the projection 16 to move into the position shown in Fig. 1. If these conditions should arise the projection 16 might wipe by the end of the clutch dog 17 and not be arrested by the shoulder 19, and this would throw the clutch dog 17 back with a quick movement, thus raising the arm 21 and tending to move the lever 23 into the position shown in Fig. 2. To prevent this from happening I have provided a construction herein which operates to hold the clutch-releasing dog 17 in its inoperative position after the lever 23 has been released until the projection 16 has just passed the shoulder 19 and then allow the clutch dog to come into its operative position so as to provide the time required for a substantially complete rotation of the shaft for the clutch dog to have its movement from its operative to its inoperative position. The shaft has rigid therewith a flange 33 which is cut away at 34, and one end 35 of which is tapering or wedge-shaped. Slidably mounted on the frame is a controlling member 36 which is herein shown as guided at one end between two pins or projections 37 and at the other end by means of a screw 38 secured to the frame and extending through a slot 39 in the member 36. This member 36 is provided with a notch 40 and the clutch-releasing dog 17 is provided with a projection 41 which occupies the notch. The controlling member 36 is capable not only of sliding movement toward and from the shaft 1 but also of slight lateral movement, this being herein accomplished by interposing a spring 42 between the head of the screw 38 and the controlling member.

When the clutch is in operation and the clutch-releasing dog 17 is in its inoperative position, as shown in Fig. 2, the controlling member 36 is in a retracted position and is held therein by engagement of the projection 41 in the notch 40. When the lever 23 is released the spring 27 tends to move it into the position shown in Fig. 1 thereby depressing the arm 21 and moving the clutch-releasing dog 17 forwardly. This movement carries the controlling member 36 into engagement with the periphery of the flange 33, as shown in Fig. 2, and said flange acting against the controller holds the clutch-releasing dog 17 in its inoperative position until the shaft has rotated to bring the space 34 opposite the controller. As soon as the space 34 comes in line with the controller 36, the latter is allowed to move forwardly, thus permitting the clutch-releasing dog 17 to move into its operative position. The space 34 is so located that this movement does not occur until just after the projection 16 has passed the shoulder 19. As a result, there is the time of substantially a complete revolution of the shaft in which the clutch-releasing dog 17 can move from its inoperative to its operative position, and this is sufficient so that even at a high rate of speed the clutch-releasing dog 17 can assume its operative position and the lever 23 can assume its locking position, as shown in Fig. 1, by the time that the projection 16 comes into engagement with the shoulder 19. After the controller 36 has been moved forwardly into the space 34, then during the continued rotation of the shaft necessary to bring the projection 16 into engagement with the shoulder 19 the inclined or wedge-shaped portion 35 of the flange 33 will act against the end of the controller 36 and move it laterally, as shown in Fig. 3, said end traveling around in the groove or space 43. When the clutch is released again by the backward movement of the clutch-releasing dog 17, the controller 36 is carried backwardly by reason of the engagement of the projection 41 in the notch 40, and as it is withdrawn from engagement with the flange 33 the spring 42 moves it into the dotted line position Fig. 4 in line with the flange 33 so that when it moves forwardly again it will be brought against the periphery of the flange. By means of this construction an interval of time is provided equal to that required for substantially one complete revolution of the shaft in which to permit the clutch-releasing dog and the lever 23 to assume the positions shown in Fig. 1, regardless of the relative position of the projection 16 and clutch dog 17 when the lever 23 is released. It will be observed that the mechanism herein illustrated is simple in construction and involves comparatively few parts. Further, because of the action of the eccentric 10 the shaft will be brought to rest without any sudden jar or vibration because the action of the eccentric in moving the sleeve 9 to the right, Fig. 1, with the projection 16 against the locked dog 17 is a gradual one which brings the shaft to rest quickly but without any severe jar. Further, since the clutch-engaging action is a wedging one, the machine will start with an easy although rapid movement.

While I have illustrated a selected embodiment of my invention, I do not wish to be limited to the constructional features shown.

I claim:

1. In a device of the class described, the combination with a shaft having an eccentric portion, of a driving clutch element loosely mounted on said shaft, a second clutch element mounted on the eccentric portion of the shaft for turning movement thereon, whereby said turning movement brings it into and out of clutching engagement with the driving clutch element, and automatically-operative means to turn said second element relative to the shaft in a direction to bring it into clutching engagement with the driving clutch element.

2. In a device of the class described, the combination with a shaft having an eccentric portion, of a driving clutch element loosely mounted on said shaft, a second clutch element, mounted on the eccentric portion of the shaft for turning movement thereabout whereby said turning movement brings it into and out of clutching engagement with the driving clutch element, automatically-operative means to turn said second element relative to the shaft in a direction to bring it into clutching engagement with the driving clutch element, and manually-controlled means to effect relative turning movement of said shaft and second clutch element in the opposite direction.

3. In a device of the class described, the combination with a shaft having an eccentric portion, of a driving clutch element loosely mounted on said shaft, a second clutch element mounted for turning movement on the eccentric portion of the shaft, turning movement of the latter element on said eccentric portion of the shaft in one direction bringing it into clutching engagement with both the driving clutch element and said shaft.

4. In a device of the class described, the combination with a shaft, of a driving clutch element loosely mounted thereon, said shaft having an eccentric portion, a second clutch element mounted for turning movement on said eccentric portion, turning movement of the latter element on the shaft in one direction bringing it into clutching engagement with both the driving clutch element and said shaft, and automatically-operative means to give said latter clutch element such turning movement.

5. In a device of the class described, the combination with a shaft, of a driving clutch element loosely mounted thereon, a second clutch element encircling the shaft and eccentrically mounted thereon, turning movement of the latter element on the shaft in one direction bringing it into clutching engagement with both the driving clutch element and said shaft, automatically-operative means to give said latter clutch element such turning movement, and manually-controlled means to effect a turning movement of said second clutch element in the opposite direction to disengage it from the shaft and driving clutch element.

6. In a device of the class described, the combination with a shaft, of a driving clutch element thereon provided with a concentric clutch surface, a second clutch element eccentrically mounted on the shaft and adapted by turning movement relative to the shaft to be brought into and out of clutching engagement with said concentric clutch surface.

7. In a device of the class described, the combination with a shaft having an eccentric portion, of a driving clutch element on said shaft provided with a concentric clutch surface, and a second clutch element on said eccentric portion, turning movement of said second element in one direction causing it to be wedged between said eccentric portion of the shaft and concentric clutch surface, thereby to clutch said driving element to the shaft.

8. In a device of the class described, the combination with a shaft having an eccentric portion, of a driving clutch element on said shaft provided with a concentric clutch surface, a second clutch element on said eccentric portion, turning movement of said second element in one direction causing it to be wedged between said eccentric portion of the shaft and concentric clutch surface, thereby to clutch said driving element to the shaft, and automatically-operative means to give said second clutch element such turning movement.

9. In a device of the class described, the combination with a shaft having an eccentric portion, of a driving clutch element on said shaft provided with a concentric clutch surface, a second clutch element on said eccentric portion, turning movement of said second element in one direction causing it to be wedged between said eccentric portion of the shaft and concentric clutch surface, thereby to clutch said driving element to the shaft, automatically-operative means to give said second clutch element such turning movement, and manually-controlled means to turn said second clutch element out of such wedging engagement thereby to release the clutch.

10. In a device of the class described, the combination with a shaft having an eccentric portion, of a driving clutch element loosely mounted on the shaft and having a concentric clutch surface, a second clutch element mounted for turning movement on said eccentric portion and adapted by such turning movement to be wedged between the concentric surface of the driving clutch element and the eccentric portion of the shaft, thereby clutching the driving clutch element to the shaft, and a clutch-releasing member to engage said second clutch element and withdraw it from such clutching position.

11. In a device of the class described, the combination with a shaft having an eccentric portion, of a driving clutch element loosely mounted on the shaft and having a concentric clutch surface, a second clutch element mounted for turning movement on said eccentric portion and adapted by such turning movement to be wedged between the concentric surface of the driving clutch element and the eccentric portion of the shaft, thereby clutching the driving clutch element to the shaft, and a clutch-releasing member to engage said second clutch element and withdraw it from such clutching position, said second clutch element when released becoming wedged between said eccentric portion of the shaft and said clutch-releasing member thereby to stop the shaft from rotation.

12. In a device of the class described, the combination with a shaft having an eccentric portion, of a driving clutch element loosely mounted on the shaft, a second clutch element mounted on said eccentric portion of the shaft, automatically-operative means tending to bring said elements into clutching engagement, a clutch-releasing member, and means to move it into operative position to engage said second element and to release it from its clutching engagement, said element when released becoming wedged between the eccentric portion of the shaft and clutch-releasing member thereby stopping rotation of the shaft.

13. In a device of the class described, the combination with a shaft having an eccentric portion, of a driving clutch element loosely mounted on the shaft, a second clutch element mounted on said eccentric portion of the shaft, automatically-operative means tending to bring said elements into clutching engagement, a clutch-releasing member, means to move it into operative position to engage said second clutch element and release it from its clutching engagement with the driving clutch element, a lock device to hold said clutch-releasing member in its operative position whereby lateral movement of the second clutch element is prevented and the shaft is thereby brought to rest.

14. In a device of the class described, the combination with a shaft having an eccentric portion, of a driving clutch element loosely mounted on the shaft, a second clutch element mounted on said eccentric portion and adapted by turning movement thereon to be brought into and out of clutching engagement with said driving clutch element, a clutch-releasing member having a stop shoulder, means to move said clutch-releasing member into position to engage the second clutch element and stop its rotation thereby releasing it from its clutching engagement, and means to permit such movement only at a predetermined point in the rotation of the shaft.

15. In a device of the class described, the combination with a shaft having an eccentric portion, of a driving clutch element loosely mounted on the shaft, a second clutch element mounted on said eccentric portion and adapted by turning movement thereon to be brought into and out of clutching engagement with said driving shaft, a clutch-releasing member adapted to be moved into position to engage said second clutch element and thereby release the clutch, and means to permit such movement only at a predetermined point in the rotation of the shaft.

16. In a device of the class described, the combination with a shaft having an eccentric portion, of a driving clutch element loosely mounted on the shaft, a second clutch element mounted on said eccentric portion and adapted by turning movement thereon to be brought into and out of clutching engagement with said driving shaft, a clutch-releasing member adapted to be moved into position to engage said second clutch element and thereby release the clutch, a controlling member associated with the clutch-releasing member, and means on the shaft coöperating with the controlling member to permit the clutch-releasing movement of said clutch-releasing member at a predetermined point only in the revolution of the shaft.

17. In a device of the class described, the combination with a shaft having an eccentric portion, of a driving clutch element loosely mounted on the shaft, a second clutch element mounted on said eccentric portion and adapted by turning movement thereon to be brought into and out of clutching engagement with said driving clutch element and shaft, a clutch-releasing member, automatically-operative means tending to move said clutch-releasing member into position to engage said second clutch element and release the clutch, and means associated with said clutch-releasing member to permit said movement at a predetermined point only in the rotation of the shaft.

In testimony whereof, I have signed my name to this specification, in the presence of two subscribing witnesses.

FRANK ZALESKI.

Witnesses:
  FREDERICK W. DAVISON,
  J. WARREN NICHOLS.